J. E. POTTS.
CAMERA.
APPLICATION FILED SEPT. 24, 1917.

1,304,093.

Patented May 20, 1919.
3 SHEETS—SHEET 1.

INVENTOR
John E. Potts,
BY
Edward Reed
ATTORNEY

J. E. POTTS.
CAMERA.
APPLICATION FILED SEPT. 24, 1917.

1,304,093.

Patented May 20, 1919.
3 SHEETS—SHEET 3.

INVENTOR
John E. Potts,
BY
Edward Reed
ATTORNEY

UNITED STATES PATENT OFFICE.

JOHN E. POTTS, OF DAYTON, OHIO.

CAMERA.

1,304,093.  Specification of Letters Patent.  Patented May 20, 1919.

Application filed September 24, 1917. Serial No 192,838.

*To all whom it may concern:*

Be it known that I, JOHN E. POTTS, a citizen of the United States, residing at Dayton, in the county of Montgomery and State of Ohio, have invented certain new and useful Improvements in Cameras, of which the following is a specification, reference being had therein to the accompanying drawing.

This invention relates to cameras and more particularly to that type of camera in which the sensitized material is in the form of a strip supported on spools or rolls. In this type of camera, as ordinarily constructed, ground glass cannot be utilized for focusing, because the position of the film is such that it would lie between the lens and the ground glass, and its construction and the manner of supporting the same are such that it cannot be readily displaced or removed during the focusing operation. In this type of camera, therefore, it has been necessary to secure the focus by adjusting the lens according to a scale or gage, which required either measuring or estimating the distance between the object to be photographed and the lens, and an inaccurate estimate of the distance resulted in an imperfect focus and a correspondingly imperfect negative.

The object of this invention is to provide a camera of this type in which a ground glass may be utilized for focusing; and to so construct and arrange the sensitized material, or film, that it will not interfere with the use of the ground glass for focusing purposes. It is also an object of the invention to provide in connection with the ground glass means whereby the image on the glass may be observed without the necessity of placing the camera in line with the eyes; and further, to provide means for quickly positioning the film with relation to the lens and the ground glass. Other objects of the invention will appear as the mechanism is described in detail.

In the accompanying drawings

In these drawings I have illustrated one embodiment of my invention and have shown the same as applied to a folding camera of the roll film type. It will be understood, however, that the invention is not limited to this particular type of camera but can be applied, with little or no modification, to cameras of various kinds in which the sensitized material, or its carrier, is in the form of a strip and is moved across the camera to bring successive portions thereof into line with the lens. It will also be understood that the term film, or film strip, as herein employed is intended to apply to any sensitized material of a flexible character, whether the several sections or portions of the material which are to receive the exposures are directly connected one to the other or are mounted upon a common carrier.

As here illustrated the camera comprises a body portion, or casing, 1, having a back wall 2 which is removable to permit the film spools 3 and 4 to be placed in position in and removed from the casing. The film is shown at 5 as comprising a continuous strip of sensitized material mounted upon the carrier, or backing strip, 6. The film and its backing strip are wound about the spool 3 and after this spool has been placed in position in the casing the carrier strip is carried along the back of the camera, attached to and wound about the spool 4. This spool is provided with the usual actuating device 7 for rotating the same and by means of which the film is advanced to bring the successive portions of the same into a position to receive the exposure. A lens 8 is mounted upon a supporting frame 9 and is connected with the casing by means of a collapsible connection, or bellows, 10. The lens supporting frame 9 is slidably mounted upon tracks 11, the outer portions of which are carried by the hinged front wall, or closure, 12, of the casing 1. In the present construction I have shown the shutter actuating device in the form of a lever 13, and a finder 14 is mounted on the lens supporting frame 9.

So much of the camera as has been above described is of well known construction and in applying my invention thereto I mount a ground glass 15 at the rear of the casing in line with the lens, this glass being preferably of a size equal to, or slightly greater than, the area of the open end of the bellows 10. The ground glass may be mounted in any suitable manner but I prefer to mount it upon the removable back wall 2, and as here shown the back wall is provided with an opening 16 and the ground glass is secured to the inner side of the removable back wall so as to completely close this opening. Consequently, when there is no obstruction between the ground glass and the lens the image may be focused upon the ground glass in the manner usual with cameras having a ground glass.

Figures 4, 5, 11, 12, 14:
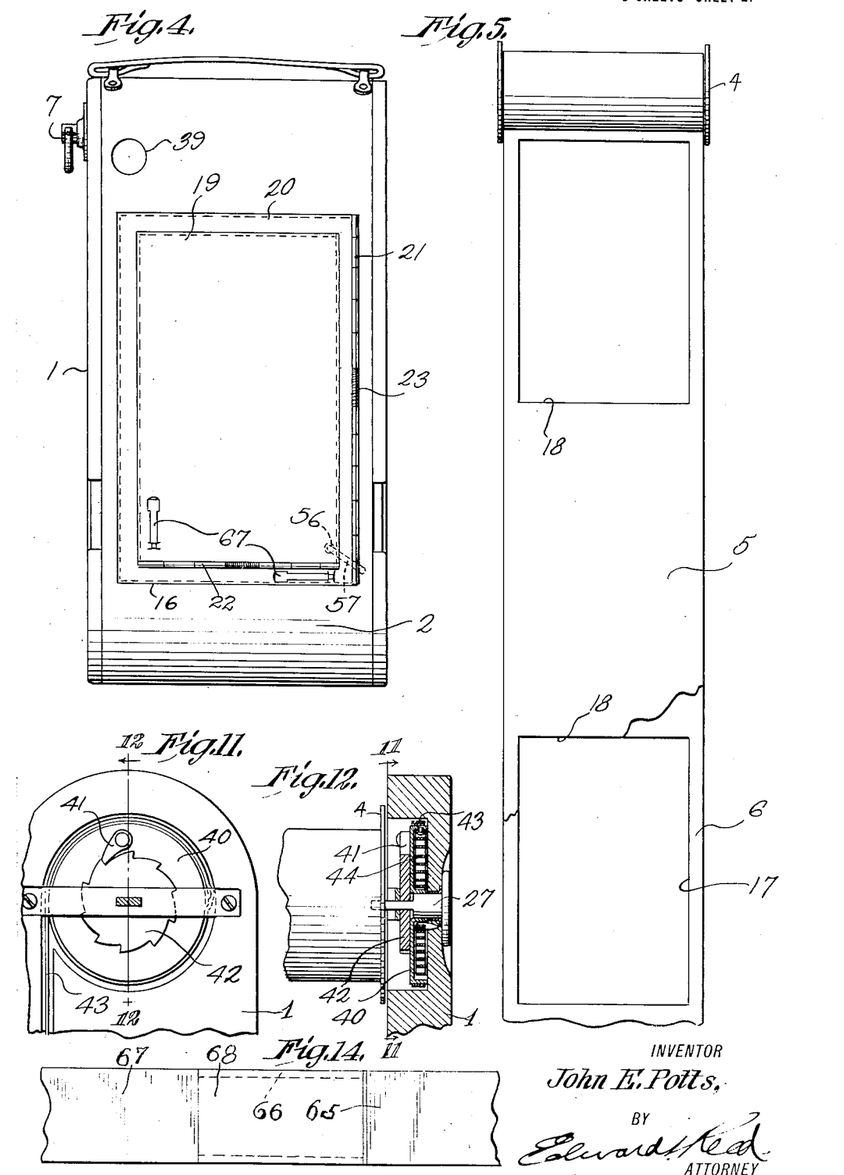
Fig. 4 is a rear elevation of the camera.
Fig. 5 is a detail view of a portion of the film strip and its carrier.
Fig. 11 is a sectional detail view of a modified form of film actuating device taken on the line 11—11 on Fig. 12.
Fig. 12 is a sectional detail view taken on the line 12—12 on Fig. 11.
Fig. 14 is a detail view of a slightly modified film construction, on a reduced scale.

In order that the film and its backing strip may not be interposed between the ground glass and the lens during the focusing operation I have provided the backing strip, or carrier, 6, for the film with a series of openings, 17, which are spaced apart distances sufficient to receive between them the sections of film upon which the exposures are to be made, the arrangement being such that an opening 17 will lie in advance of each section of film. The sections of film may be mounted on the backing strip in any suitable manner but I prefer that the several sections should be connected one with the other independently of the backing strip and I have, therefore, shown the several sections as formed in a continuous strip, 5, and as having openings 18 registering with the openings 17 in the backing strip, the openings being of a width less than the width of the film strip so as to leave portions of the film along each side of the opening to connect the several sections one to the other. The openings may be formed in any suitable manner, but I prefer to mount the film strip on its backing strip and to then simultaneously form the openings in the two strips, as in this way perfect registration is secured. Obviously the same result may be secured by sensitizing only alternate portions of the film instead of cutting away portions of the film, thus the clear, transparent film lying between the sections of sensitized film will constitute sight openings between said sections of sensitized film. In Fig. 14 I have shown a film strip 65 supported by a carrier 66 and having alternate portions sensitized, as shown in 67, and the other portions clear and transparent, as shown in 68. The film strip and its backing strip are wound about the spools 3 and 4 in the usual manner and the spool 4 is actuated to advance the strip until an opening 17—18 is brought into alinement with the ground glass. After the focus has been obtained the film strip and its backing strip are again advanced to bring into alinement with the lens, and the ground glass, the next succeeding section of film, on which the exposure is to be made. After the exposure is made, the winding off of the exposed section of film brings another opening into alinement with the ground glass so that the camera is again ready for focusing.

Figures 1, 2, 3, 13:
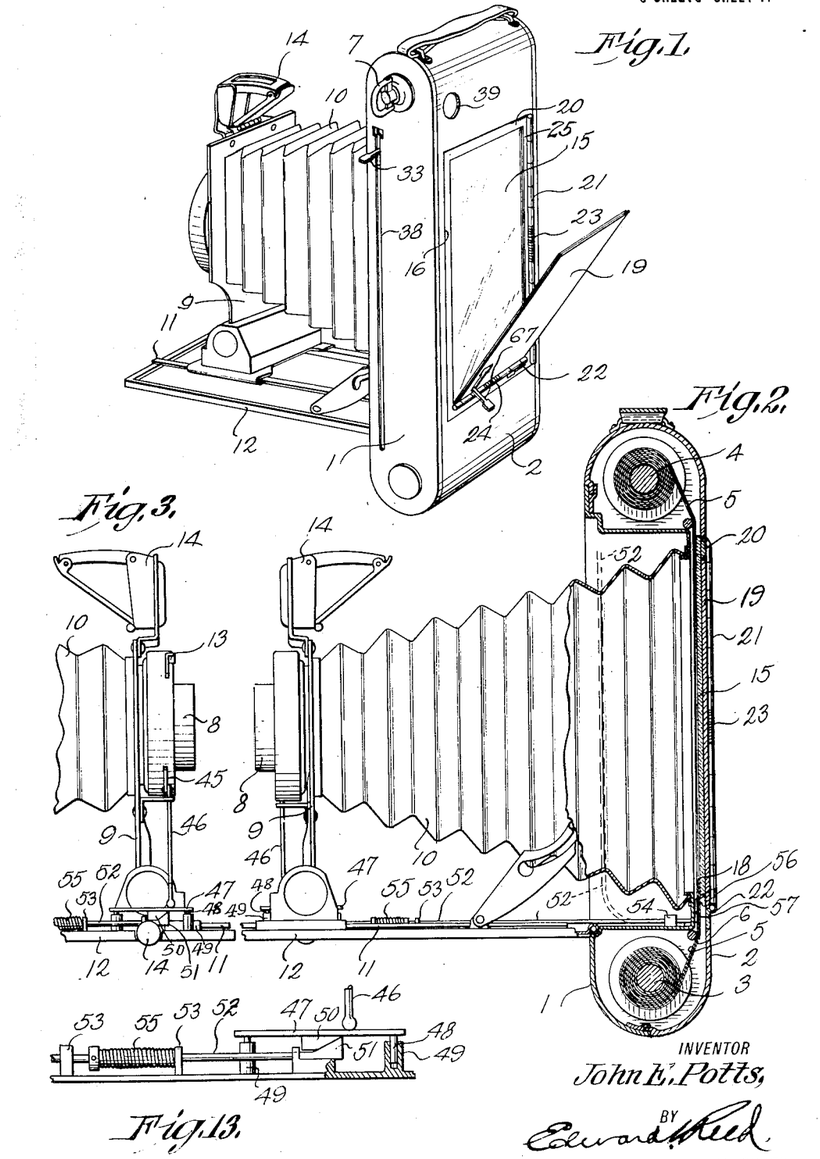
Figure 1 is a perspective view of a camera embodying my invention.
Fig. 2 is a side elevation of such a camera with the casing in section.
Fig. 3 is a side elevation of the forward end of the camera viewed from that side opposite the side shown in Fig. 2.
Fig. 13 is a detail view of the automatic shutter operating device.

A suitable closure is provided for the opening 16 in the removable back wall 2 of the casing 1 to protect the ground glass and to exclude the light when the ground glass is not being used for focusing purposes. It is also desirable that means should be provided whereby the image on the ground glass may be observed without the necessity of bringing the camera into line with the eyes. This I accomplish by providing in connection with the ground glass a mirror which may be positioned to extend upwardly and rearwardly from the lower edge of the ground glass at an acute angle, and which, when in this position, will accurately reflect the image as it appears on the ground glass, thus enabling the camera to be held near the waistline of the operator during the focusing operation, the operator looking down upon the mirror. For the sake of neatness and compactness I have combined the mirror with the closure for the opening 16, which closure is indicated by the reference numeral 19, the mirror being formed, or mounted, upon the inner surface of the closure. In hand cameras the negative is usually oblong and the camera is held either vertically or horizontally during the taking of the picture according to the position which the picture is to occupy on the film. In order that the mirror may be properly positioned for use with the camera in either position I have connected the same with the back wall 2 by means of a double hinged connection. This connection comprises a frame 20, which fits within the opening 16 and is hinged to the back wall along the adjacent edge of that opening, as shown at 21. This frame has an opening of a size to receive the combined closure and mirror 19, which fits snugly within the same and is hinged at one end to the adjacent end of the frame, as shown at 22, that edge of the frame to which the closure is hinged extending at right angles to that edge of the frame which is hinged to the back wall 2. When the camera is held in a vertical position the closure is swung outward from the frame 20, as shown in Fig. 1, and when the camera is held in a horizontal position the closure is retained in its position within the frame 20 and the frame itself is swung outward about the hinged connection 21. Preferably the frame and the closure are acted upon by springs 23 and 24 respectively to hold them normally in their positions within the opening in the back wall, the inward movement of the closure 19 being limited by a projection or rabbet 25 on the edge of the frame, so as to maintain the closure within the opening in the frame when the latter is moved about its hinged connection to the back wall. The rabbeted edge of the frame may be provided with a felt packing to more effectually exclude the light. The combined closure and mirror may be retained in its adjusted position in any suitable manner, and in the present construction I accomplish this by mounting on the closure and the frame folding finger pieces or levers 67 which may be positioned to permit them to be engaged by the thumb of the hand which supports the camera. Pressure on the finger piece will then move the closure, or the closure and the frame, as the case may be, into its adjusted position, in which it will be retained until the finger piece is released. The mirror can in this way be quickly and easily positioned and can be easily released to permit it to be returned to its closed position.

Figures 6, 7, 8, 9, 10, 15:
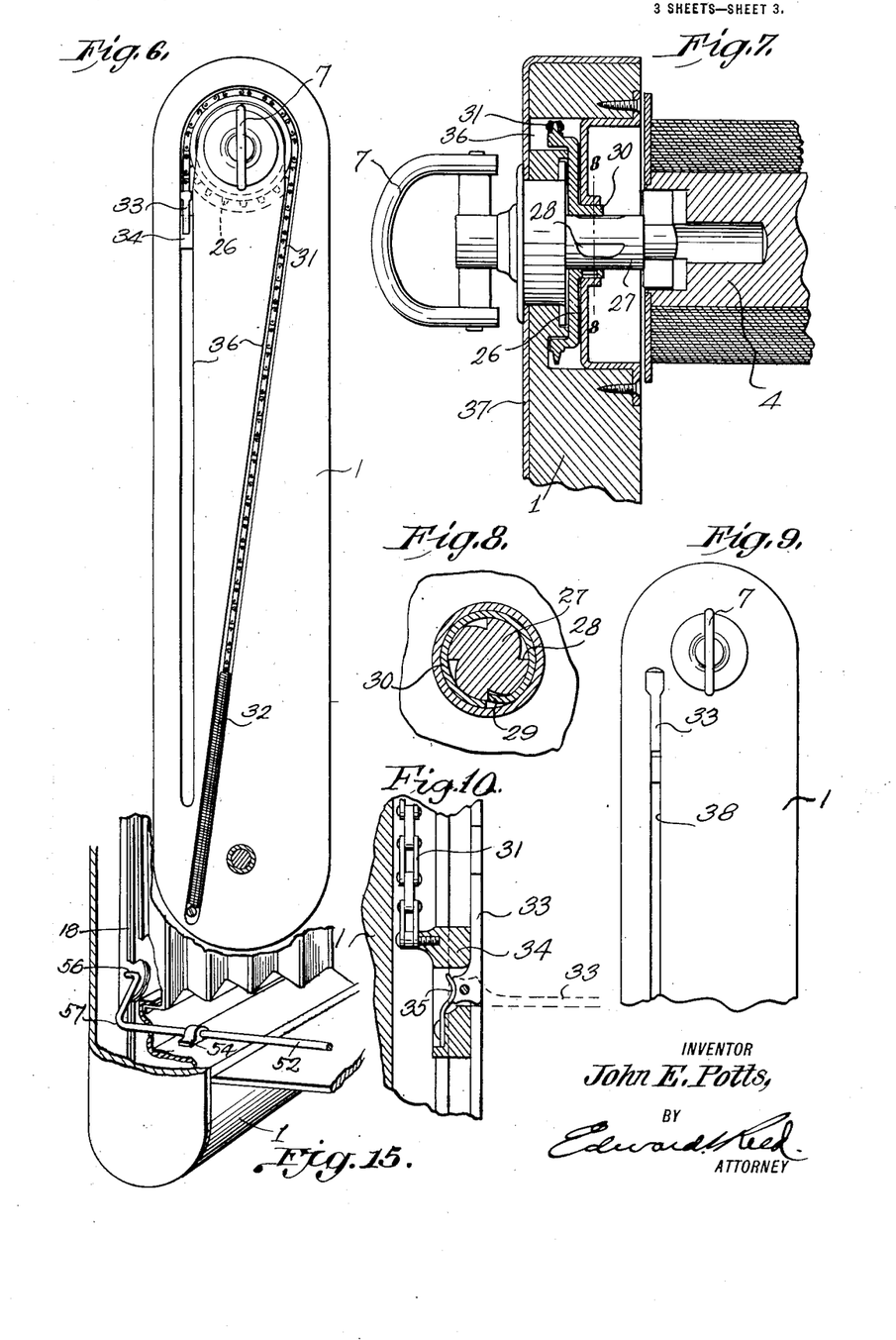
Fig. 6 is a side elevation of the camera with the outer covering removed to show the film actuating device.
Fig. 7 is a sectional detail view of one of the film spools showing the manner of connecting the actuating device thereto.
Fig. 8 is a detail sectional view of the connection between the actuating sprocket and the shaft of the film spool taken on the line 8—8 on Fig. 7.
Fig. 9 is a side elevation of the upper portion of the casing.
Fig. 10 is a detail view of the finger piece for operating the film actuating device.
Fig. 15 is a perspective view of one corner of the camera, partially broken away to show the shutter operating rod.

While the usual actuating device 7 may be utilized for adjusting the film I prefer to provide an additional actuating device by means of which the film may be quickly and easily advanced without disturbing the position of the camera. To accomplish this I have connected with the spool 4 an actuating device having movement lengthwise of the casing and of such a character that a single movement thereof will fully advance the film strip to bring either an opening or a film section into alinement with the ground glass. In that form of the actuating device shown in Figs. 6 to 10 I have mounted a sprocket wheel 26 upon the shaft 27 of the spool 4 and have connected the same thereto by a pawl and ratchet clutch so that it may move freely in one direction without disturbing the film, but if moved in the opposite direction will cause the film to be wound about the spool. In the form here shown the shaft is provided with teeth 28 adapted to be engaged by a pawl 29 carried by a hub 30 of the sprocket wheel and preferably formed integral therewith. Extending about the sprocket wheel is a sprocket chain 31 to one end of which is connected a spring 32 having its other end secured to the casing near the lower end thereof. The opposite end of the sprocket chain is provided with an operating device which is preferably in the form of a short arm, or thumb piece, 33, pivotally mounted on a block 34 secured to the end of the chain and is adapted to be moved either into an extended position, as shown in the dotted lines in Fig. 10, or to be folded into an opening or slot, as shown in the full lines in Fig. 10. A spring 35 serves to retain the lever in its adjusted position. This actuating mechanism may be mounted in the side of the casing in any suitable manner, but as here shown I have formed in the body of the side wall a groove 36 having a curved portion extending about the sprocket wheel and having two downwardly extending portions, and the sprocket chain and spring 32 are mounted in this groove. When the outer cover 37 of the side wall, which is usually of leather, is in position the chain and spring are concealed from view, but the outer cover is provided with a slot 38 through which the lever 33 projects and along which it is moved to actuate the film spool. The downward movement of the lever will actuate the spool sufficiently to advance the film one space, and when the lever is released the spring 32 will return the chain and sprocket wheel to their normal positions without affecting the position of the spool. The actuating device itself may be so controlled as to properly position the film, or the backing strip may be provided with marks, in the usual manner, to indicate the position of the film, these marks being readable through a sight opening 39. In Figs. 11 and 12 I have shown a slightly modified form of the actuating device in which a drum 40 is loosely mounted on the shaft 27 of the film spool and is provided with a pawl 41, which engages with a ratchet wheel 42 on the shaft and thus serves to connect the drum with the spool. A flexible band is connected with and wound about the drum and is provided at its outer end with an actuating lever similar to that shown in Fig. 10, by means of which the band may be unwound from the drum and rotary movement imparted to the spool. A spring 44, which is preferably mounted within the drum, serves to rewind the band when the latter has been released.

Preferably a special shutter actuating lever is provided, as shown at 45, to enable the shutter to be opened and closed for focusing purposes without altering the setting of the usual shutter actuating device, for time, instantaneous, or bulb exposures. To avoid the possibility of the shutter being allowed to remain open after the completion of the focusing operation I have provided means for automatically closing the same. This is preferably accomplished by establishing an operative connection between the supplemental shutter operating lever and the closure for the opening in the back wall of the casing, this connection being such that when the closure is moved to its open position the shutter will be opened and when the closure is moved to its closed position the shutter will be closed. This connection may take various forms, but as here shown I have connected with the supplemental shutter operating lever a depending arm, or rod, 46, which is slidably mounted on the lens supporting frame and is permitted to have vertical movement only. Coöperating with this rod is an actuating plate 47 mounted on the hinged front wall of the casing, which forms the support for the lens frame when the camera is in its extended position, and so arranged that vertical movement may be imparted thereto. Preferably the plate is provided with depending guide pins 48 which fit within sockets 49, and which, while permitting the vertical movement of the plate, retain the same in a position parallel with the supporting wall during its vertical movement. The plate is so arranged with relation to the shutter actuating rod 46 that the end of this rod will be close to the upper surface of the plate, and the length of the plate is such that the rod will be positioned above the plate, so as to be actuated by the vertical movement thereof, when the lens supporting frame has been moved into any one of its focusing positions. The plate 47 is provided with a cam surface 50, preferably arranged beneath the same, which co-operates with a cam plate 51 secured to the end of a rod 52, which is slidably mounted in bearings 53 on the front wall of the camera and in a bearing 54 on the lower wall of the casing. A spring 55 is coiled about the rod and acts upon the same to move it toward the casing, thus causing the cam carried thereby to engage the cam carried by the plate 47 and thus impart vertical movement to the plate, which movement is transmitted through the rod 46 to the shutter actuating lever 45, causing the shutter to be opened. The operation of the shutter actuating lever 45 is such that the shutter will be retained in its open position so long as pressure is applied to the lever, but will be closed as soon as the lever is released, after the manner of the ordinary shutter operating lever when the shutter is set for so called "bulb" exposures. The end of the rod 52 extends about the edge of the rear end of the bellows 10 and engages the closure 19 near one corner of the same, as shown at 56, in Fig. 4. To permit of this engagement the end of the rod is offset, as shown at 57. The length of the rod is such that when the closure is in its closed position the rod will be forced inwardly against the tension of the spring 55 and the cams moved out of engagement to permit the plate to move downward so that the shutter will close.

When the closure is opened the spring will move the rod rearwardly and thus cause the shutter to be opened. By causing the end of the rod to engage the closure near that corner adjacent to the hinged edges of the closure and its supporting frame the rod will be actuated by the movement of the closure when the latter is moved either about its own hinge or about the hinge of the supporting frame, thus rendering the automatic control operative when the camera is supported in either a horizontal or vertical position. The rod 52 is of such a character that it will not interfere with the closing of the hinged front wall of the casing when the camera is folded, this being preferably accomplished by forming the rod of a flexible material, such as a small gage piano wire.

The operation of the device will be readily understood and it will be apparent that when a picture is to be made the film is positioned with an opening in alinement with the ground glass and the combined closure and mirror moved to its open position, in which the mirror is in operative relation with the ground glass. This movement of the mirror causes the shutter to be opened, thus permitting the focus to be obtained upon the ground glass. After the focus has been completed the combined closure and mirror is moved to its closed position, thus causing the shutter to be closed, the thumb-piece 33 is actuated to advance a film section into a position to receive the exposure, and the exposure is made in the usual manner.

While I have shown and described one embodiment of my invention I wish it to be understood that I do not desire to be limited to the details of construction as various modifications will occur to a person skilled in the art.

Having now fully described my invention, what I claim as new and desire to secure by Letters Patent, is:—

1. In a camera, a casing having an opening therein, a lens arranged in alinement with said opening, a ground glass mounted in alinement with said opening, a closure for said opening, a flexible carrier mounted within said casing and having openings therein, said openings being spaced apart to permit sections of sensitized material to be mounted on said carrier, between said openings, and means for actuating said carrier to bring said openings and said sections of sensitized material alternately into alinement with said lens.

2. In a camera, a casing having an opening in the rear of the wall thereof, a lens arranged in alinement with said opening, a ground glass mounted on said casing in alinement with said opening, a mirror secured at its lower edge to said casing near the lower edge of said ground glass and adapted to extend upwardly and outwardly at an acute angle to said ground glass, a flexible carrier mounted within said casing and having openings therein spaced apart to permit sensitized material to be mounted thereon, between said openings, and means for actuating said carrier to bring said openings and said sections of sensitized material alternately into alinement with said lens.

3. In a camera, a casing having an opening in the rear wall thereof, a lens arranged in alinement with said opening, a ground glass mounted in alinement with said opening, a mirror pivotally connected at its lower edge to said rear wall adjacent to the lower edge of said opening and adapted to form a closure for said opening, a flexible carrier mounted within said casing and having openings formed therein and spaced apart to permit sections of sensitized material to be mounted thereon, between said openings, and means for actuating said carrier to cause said openings and said sections of sensitized material to be brought alternately into alinement with said lens.

4. In a camera, a casing adapted to be supported in either one of two positions and having an opening in the back wall thereof, a lens arranged in alinement with said opening, a ground glass mounted in alinement with said opening, and a mirror permanently connected with said back wall and adapted to be positioned to extend upwardly and rearwardly from either one of two edges of said opening, according to the position of said camera.

5. In a camera, a casing adapted to be supported in either one of two positions and having an opening in the back wall thereof, a lens arranged in alinement with said opening, a ground glass mounted in alinement with said opening, a frame mounted in said opening and hinged to said casing at one edge thereof, a mirror mounted in said frame and hinged thereto along an edge extending at right angles to the line of the connection between said frame and said casing.

6. In a camera, a casing adapted to be supported in either one of two positions and having an opening in the back wall thereof, a lens arranged in alinement with said opening, a ground glass mounted in alinement with said opening, a frame mounted in said opening and hinged to said casing at one edge thereof, a mirror mounted in said frame and hinged thereto along an edge extending at right angles to the line of the connection between said frame and said casing, a flexible carrier mounted within said casing and having openings therein spaced apart to permit sections of sensitized material to be mounted thereon and arranged between said openings, and means for actuating said carrier to cause said openings and said sections of sensitized material to be brought alternately into alinement with said lens.

7. In a camera, a casing having an opening in the rear wall thereof, a lens arranged in alinement with said opening, a ground glass mounted in alinement with said opening, a flexible carrier mounted within said casing and having openings therein spaced apart to permit sections of sensitized material to be mounted thereon and arranged between the openings therein, an actuating device for said carrier, a single operation of which will actuate said carrier to move an opening into alinement with said lens or to move a section of sensitized material into alinement with said lens.

8. In a camera, a casing having an opening in the rear wall thereof, a lens arranged in alinement with said opening, a ground glass mounted in alinement with said opening, a flexible carrier mounted within said casing and having openings spaced apart, said carrier having sections of sensitized material mounted thereon and arranged between the openings therein, a spool about which said carrier is wound, a flexible member connected with said spool to rotate the same when said flexible member is moved in one direction only, a finger piece connected with said flexible member, and a spring to return said flexible member to its normal position.

9. In a camera, a casing comprising a back wall and side walls, said back wall having an opening therein, a lens arranged in alinement with said opening, a ground glass mounted in alinement with said opening, a spool journaled in said side walls, a flexible carrier mounted in said casing and wound about said spool, said carrier having openings therein spaced apart to permit sections of sensitized material to be mounted thereon and arranged between the openings therein, one of the side walls of said casing having a groove therein, a flexible actuating member mounted in said groove and connected with said spool, an operating device connected with said actuating member and projecting beyond said groove.

10. In a camera, a casing comprising a back wall and side walls, said back wall having an opening therein, a lens arranged in alinement with said opening, a ground glass mounted in alinement with said opening, a spool journaled in said side walls, a flexible carrier mounted in said casing and wound about said spool, said carrier having openings therein spaced apart to permit sections of sensitized material to be mounted thereon and arranged between the openings therein, a rotatable member having a pawl and ratchet connection with said spool, that side wall adjacent to said rotatable member having a channel therein, a flexible actuating member mounted in said channel and connected with said rotatable member, a slotted covering for said channeled side wall, and a finger piece connected with said flexible actuating member and extending through the slot in said covering.

11. In a camera, a casing comprising a back wall and side walls, said back wall having an opening therein, a lens arranged in alinement with said opening, a ground glass mounted in alinement with said opening, a spool journaled in said side walls, a flexible carrier mounted in said casing and wound about said spool, said carrier having openings therein spaced apart to permit sections of sensitized material to be mounted thereon and arranged between the openings therein, a sprocket wheel having clutch connection with said spool, a channel formed in that side of said casing adjacent to said sprocket wheel, a sprocket chain mounted in said channel and extending about said sprocket wheel, a spring connected with one end of said sprocket chain, a finger piece connected with the other end of said sprocket chain, and a covering for the side wall of said casing having a slot through which said finger piece projects.

12. In a camera, a casing comprising a back wall and side walls, said back wall having an opening therein, a lens arranged in alinement with said opening, a ground glass mounted in alinement with said opening, a spool journaled in said side walls, a flexible carrier mounted in said casing and wound about said spool, said carrier having openings therein spaced apart to permit sections of sensitized material to be mounted thereon and arranged between the openings therein, a rotatable member having clutch connection with said spool, a flexible member extending about said rotatable member and having a finger piece connected with one end thereof whereby said spool may be rotated in one direction, and a spring to rotate said rotatable member in the opposite direction.

13. In a camera, a casing comprising a back wall and side walls, said back wall having an opening therein, a lens arranged in alinement with said opening, a ground glass mounted in alinement with said opening, a spool journaled in said side walls, a flexible carrier mounted in said casing and wound about said spool, said carrier having openings therein spaced apart to permit sections of sensitized material to be mounted thereon and arranged between the openings therein, a sprocket wheeel having a pawl and ratchet connection with said spool, a sprocket chain extending about said sprocket wheel, a finger piece connected with one end of said chain, and a spring connected with the other end thereof.

14. In a camera, a casing comprising a back wall and side walls, said back wall having an opening therein, a lens arranged in alinement with said opening, a ground glass mounted in alinement with said opening, a spool journaled in said side walls, a flexible carrier mounted in said casing and wound about said spool, said carrier having openings therein spaced apart to permit sections of sensitized material to be mounted thereon and arranged between the openings therein, a rotatable member having clutch connection with said spool, a flexible member connected with said rotatable member, a finger piece pivotally connected with said flexible member, and a covering for the side wall of said casing having a slot through which a finger piece may be caused to project.

15. In a camera, a casing comprising a back wall, said back wall having an opening therein, a lens arranged in alinement with said opening, a ground glass mounted in alinement with said opening, a spool journaled in said casing, a flexible carrier mounted in said casing and wound about said spool, said carrier having openings therein spaced apart to permit sections of sensitized material to be mounted thereon and arranged between the openings therein, a rotatable member having a pawl and ratchet connection with said spool, a spring to move said rotatable member in one direction and other means to move said rotatable member in the opposite direction.

16. In a camera, a casing having an opening in the rear wall thereof, a lens arranged in alinement with said opening, a shutter for said lens, a ground glass mounted in alinement with said opening, a closure for said opening, a shutter actuating device, and means controlled by said closure for actuating said shutter actuating device.

17. In a camera, a casing having an opening in the rear wall thereof, a lens arranged in alinement with said opening, a shutter for said lens, a ground glass mounted in alinement with said opening, a closure for said opening, a shutter actuating device, a cam actuated device for operating said shutter actuating device, and means controlled by said closure for operating said cam actuated device.

18. In a camera, a casing having an opening in the rear wall thereof, a lens arranged in alinement with said opening, a shutter for said lens, a ground glass mounted in alinement with said opening, a closure for said opening, a shutter actuating device, and a rod operatively connected with said shutter actuating device and arranged to be actuated by said closure.

19. In a camera, a casing having an opening in the rear wall thereof, a lens arranged in alinement with said opening, a shutter for said lens, a ground glass mounted in alinement with said opening, a closure for said opening, a shutter actuating device, a rod connected with said actuating device, a plate arranged adjacent to the end of said rod and capable of movement lengthwise of said rod to actuate the latter, a second rod connected with said plate to impart movement thereto and arranged to be actuated by said closure.

20. In a camera, a casing having an opening therein, a lens arranged in alinement with said opening, a shutter to control said lens, a ground glass mounted in alinement with said opening, a closure for said opening, a flexible carrier mounted within said casing and having openings therein, said openings being spaced apart to permit sections of sensitized material to be mounted thereon and arranged between said openings, means for actuating said carrier to bring said openings and said sections of sensitized material alternately into alinement with said lens, an actuating device for said shutter, and means controlled by said closure to operate said device.

21. In a camera, a casing having an opening therein, a lens arranged in alinement with said opening, a shutter to control said lens, a ground glass mounted in alinement with said opening, a closure for said opening, a flexible carrier mounted within said casing and having openings therein, said openings being spaced apart to permit sections of sensitized material to be mounted thereon and arranged between said openings, means for actuating said carrier to bring said openings and said sections of sensitized material alternately into alinement with said lens, an actuating device for said shutter, a rod connected with said shutter actuating device and adapted to be engaged and actuated by said closure to move the same in one direction, and a spring to move said rod in the other direction.

22. In a camera, a casing having an opening therein, a lens arranged in alinement with said opening, a shutter to control said lens, a ground glass mounted in alinement with said opening, a closure for said opening, a flexible carrier mounted within said casing and having openings therein, said openings being spaced apart to permit sections of sensitized material to be mounted thereon and arranged between said openings, means for actuating said carrier to bring said openings and said sections of sensitized material alternately into alinement with said lens, an actuating device for said shutter, a plate mounted for bodily movement, means for operatively connecting said plate with said shutter actuating device, a rod operatively connected with said plate to impart movement thereto and having one end arranged to be engaged by said closure, and a spring to hold said rod normally in engagement with said plate.

23. In a camera, a casing having an opening therein, a lens arranged in alinement with said opening, a shutter to control said lens, a ground glass mounted in alinement with said opening, a closure for said opening, a flexible carrier mounted within said casing and having openings therein, said openings being spaced apart to permit sections of sensitized material to be mounted thereon and arranged between said openings, means for actuating said carrier to bring said openings and said sections of sensitized material alternately into alinement with said lens, an actuating device for said shutter, an arm connected with said shutter actuating device, a plate mounted for movement toward and from said arm and arranged in operative relation thereto, a rod slidably mounted adjacent to said plate, said rod and said plate having co-operating cam surfaces and that end of said rod remote from said plate being arranged to be engaged by said closure, and a spring to hold said rod in engagement with said closure.

24. In a folding camera, a casing having an opening in one side thereof and having a hinged wall opposite said opening, a lens arranged in alinement with said opening and adapted to be supported by said hinged wall when the latter is in its extended position, a ground glass mounted in alinement with said opening, a closure for said opening, a flexible carrier mounted within said casing and having openings therein, said openings being spaced apart to permit sections of sensitized material to be mounted thereon and arranged between said openings, means for actuating said carrier to bring said openings and said sections of sensitized material alternately into alinement with said lens, an actuating device for said shutter, and an operative connection between said lens actuating device and said closure comprising a rod slidably mounted on said hinged wall and operatively connected with said lens actuating device, one end of said rod extending into the path of said closure so as to be engaged thereby when the closure is moved into its closed position, and a spring arranged to move said rod toward said closure.

25. In a folding camera, a casing having an opening in one side thereof and having a hinged wall opposite said opening, a lens arranged in alinement with said opening and adapted to be supported by said hinged wall when the latter is in its extended position, a ground glass mounted in alinement with said opening, a closure for said opening, a flexible carrier mounted within said casing and having openings therein, said openings being spaced apart to permit sections of sensitized material to be mounted thereon and arranged between said openings, means for actuating said carrier to bring said openings and said sections of sensitized material alternately into alinement with said lens, an actuating device for said shutter, an operative connection between said closure and said lens actuating device comprising a resilient rod slidably mounted in bearings on said casing and on said hinged wall thereof, said rod being operatively connected with said shutter actuating device and having its other end arranged in the path of said closure to be engaged thereby as said closure is being moved into its closed position, and a spring to move said rod toward said closure.

In testimony whereof, I affix my signature hereto.

JOHN E. POTTS.